Nov. 9, 1965  E. A. LINDGREN  3,217,085
ELECTRICAL ISOLATION ROOM
Filed Aug. 31, 1964  4 Sheets-Sheet 1

INVENTOR:
ERIK A. LINDGREN
BY
ATT'Y

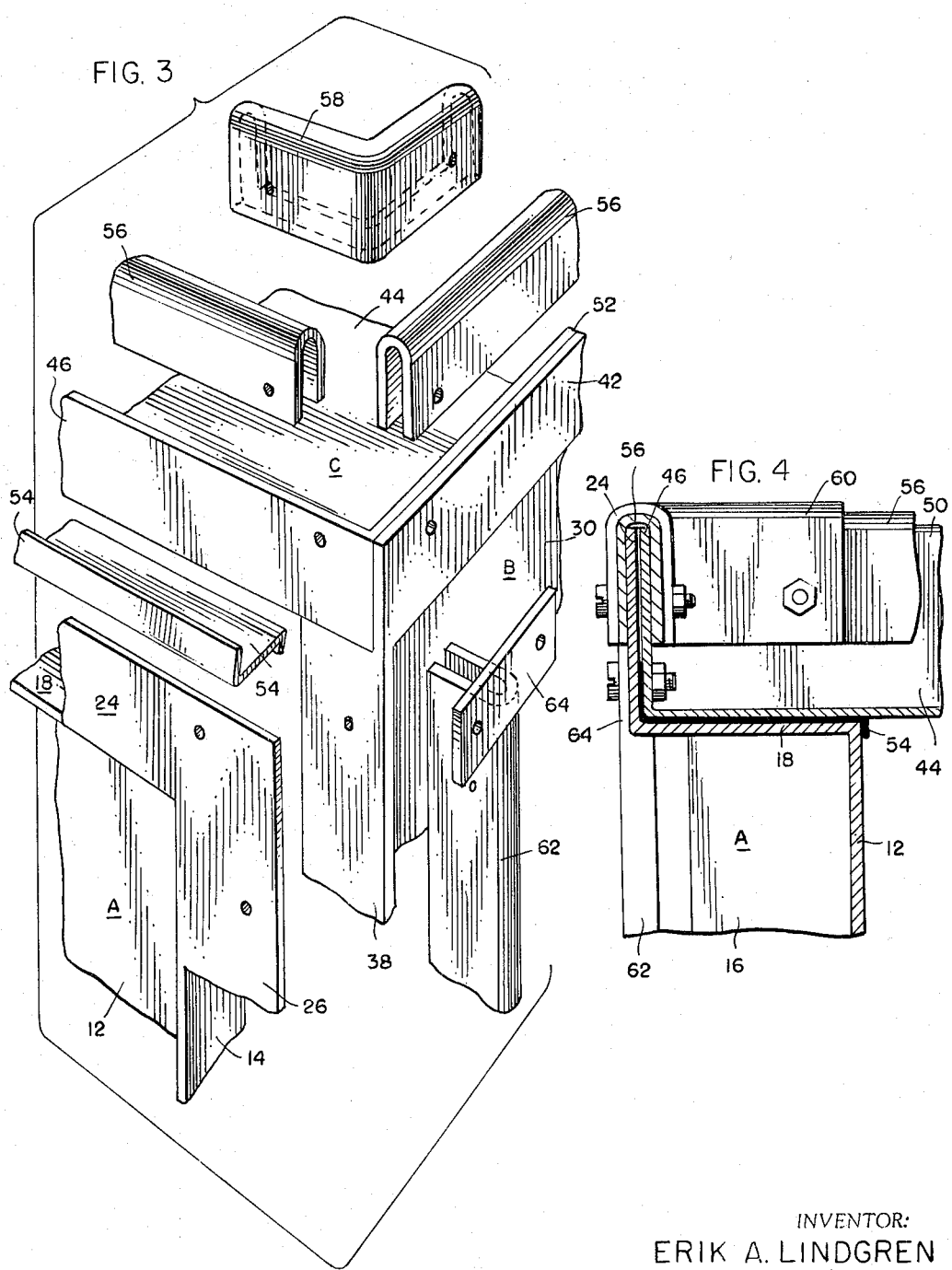

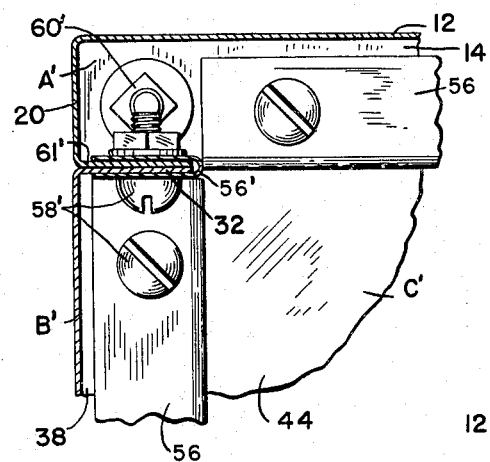
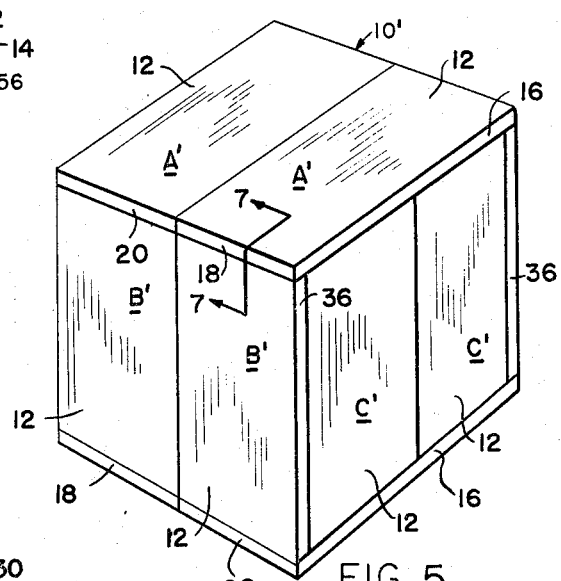
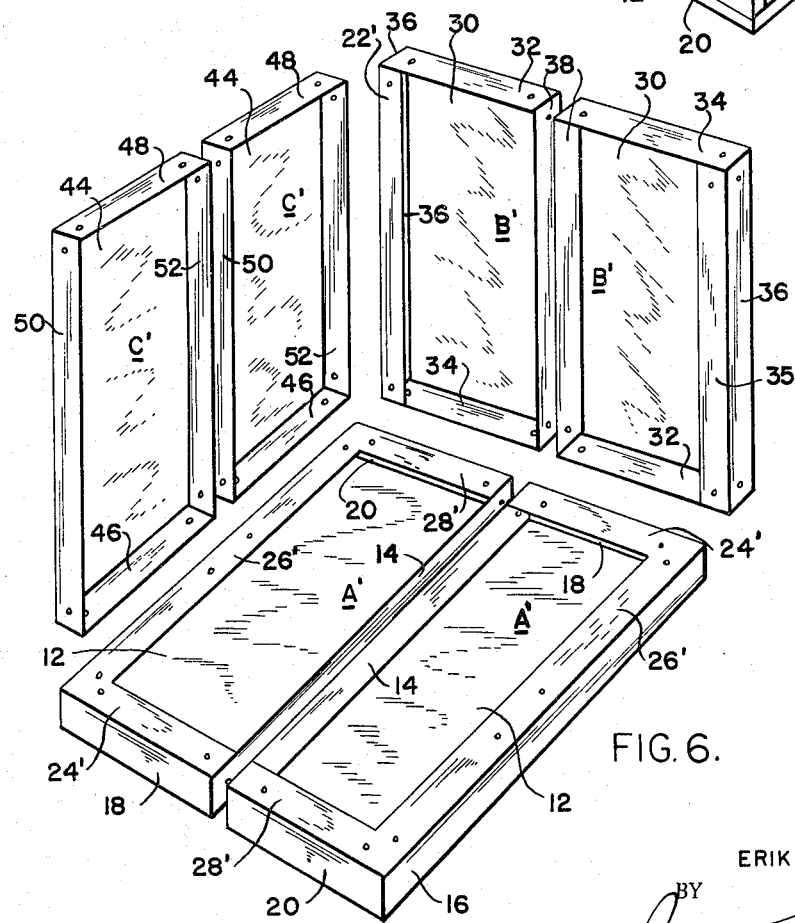

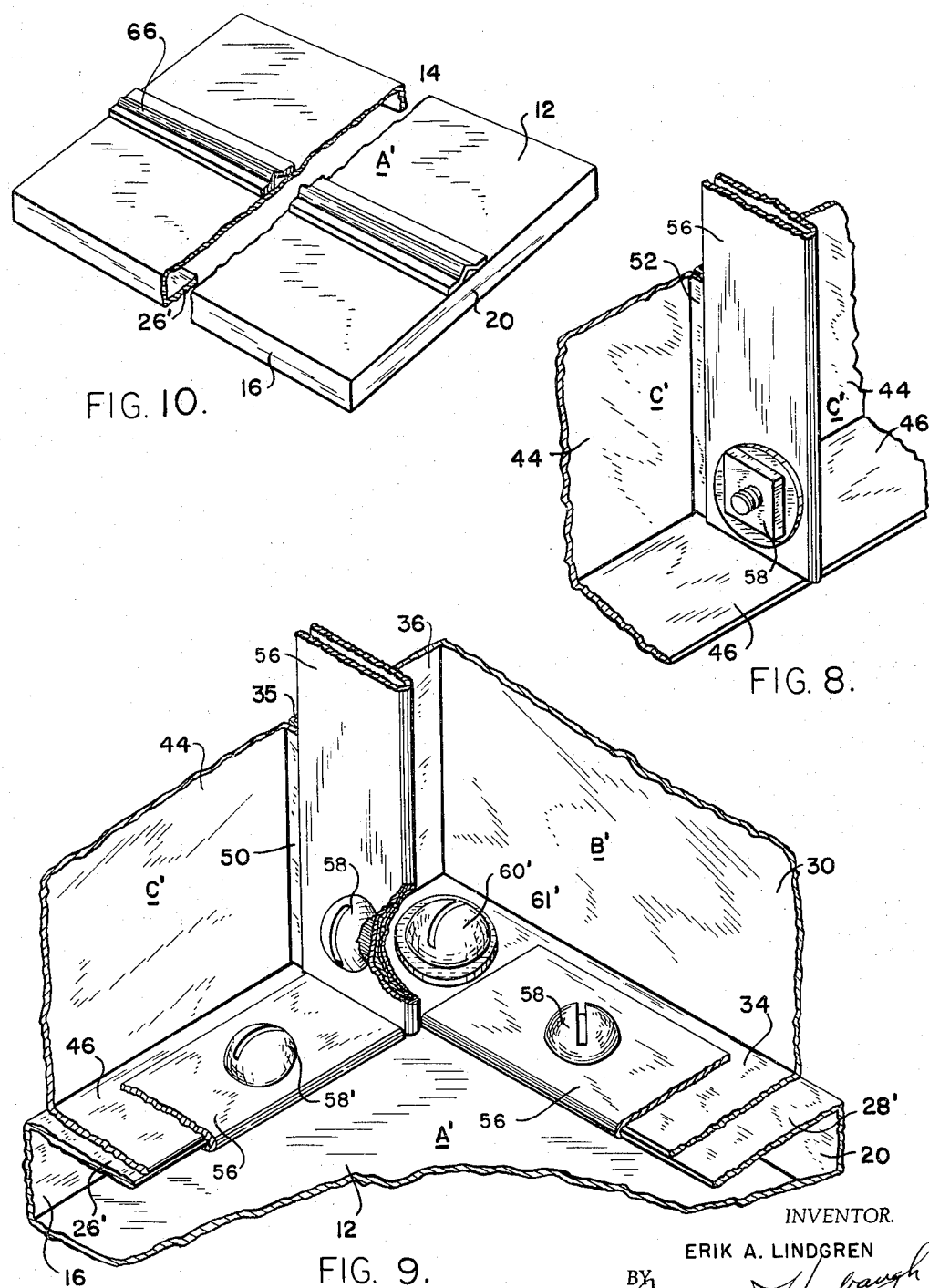

United States Patent Office 3,217,085
Patented Nov. 9, 1965

3,217,085
ELECTRICAL ISOLATION ROOM
Erik A. Lindgren, 4515 N. Ravenswood Ave.,
Chicago, Ill.
Filed Aug. 31, 1964, Ser. No. 406,953
12 Claims. (Cl. 174—35)

This application is a continuation-in-part of my copending application Serial No. 172,670 filed February 12, 1962, now abandoned, and Serial No. 223,788 filed Sept. 14, 1962, now abandoned.

This invention relates in general to an electrically shielded enclosure often referred to as an isolation room for protection from high frequency wave emanations and magnetic fields and relates in particular to the panel configuration and the securing means for holding the adjacent panels of a portable prefabricated installation together whereby the entire isolation room may be readily assembled and disassembled entirely within the room with a minimum of effort without loss of the desired shielding effectiveness.

Shielding efficiency is related to conductivity and non-permeability and it is known that continuous electrical conductivity between contiguous points in a shielding element affords a pronounced efficiency shield in the intermediate and lower wave bands.

Isolation rooms are primarily used in laboratories and in other places where various types of tests are performed upon electrical equipment, for example, radio interference measurements, radio frequency calibrations, testing equipment for measuring minute voltages and testing of various other electronic devices and appliances. The purpose of such enclosures or isolation rooms is to intercept and dissipate stray electromagnetic and electrostatic waves which would otherwise be the cause of serious disruption of the testing of the devices.

In the past, isolation rooms have taken one of three standard forms. Either as a single-shielded structure wherein a single sheet of material having a substantially planar surface is utilized for the interference dissipation; as a double-shielded enclosure wherein a pair of shielded sheets of material are spaced apart and insulated from one another for dissipation of higher wave emanations; and as the cell-type structure wherein double-shielded structures are conductively coupled to one another to form a continuous surface for the desired interference dissipation.

The isolation room of this invention relates primarily to the single shield type and is formed from a plurality of prefabricated panels in a manner to permit various size rooms to be constructed. The panels provide a semirigid overall structure with the members utilized for the structure.

Formation of an isolation room from a plurality of prefabricated panels is well known in the art as well as the formation of an isolation room of the single shield type. This invention is an improvement over the geometrical relationship and configuration of prefabricated panels and the connecting devices of the prior art permitting complete assembly of the room from one side of the panels to provide a more effective, portable isolation room for protection from high frequency wave emanations and magnetic fields.

In recognition of the desired objects and factors of an isolation room, it is the principal object of this invention to provide an improved prefabricated multi-panel isolation room construction utilizing single shields of a metallic material in which continuity of conduction between contiguous panels is established by the panel connecting devices.

A specific object of this invention is to provide an improved connecting device for releasably securing prefabricated panels of a single shield material to form an isolation room whereby continuity of conduction between the adjacent panels is maintained.

Another object of this invention is to provide an improved connecting device for securing adjacent prefabricated panels of an electrically isolated room which permits assembly and disassembly of the panels entirely from one side of the panels.

A further object of this invention is to provide an improved connecting device for securing adjacent prefabricated panels of an electrically isolated shield room which readily permits assembly and disassembly of the panels in close quarters preferably from within the room without loss or injury of the shielding effectiveness.

Another object of this invention is to provide an improved panel construction formed from a unitary piece of shielding material.

A still further object of this invention is to provide an improved demountable isolation room formed from three basic prefabricated types of panels which may be interconnected to form an isolation room of any desired size.

The features of the present invention which are believed to be novel are set forth with particularity in the appended claims. The geometrical relationship and the manner of formation of the invention, together with further objects and advantages thereof, may best be understood by reference to the following description taken in connection with the accompanying drawings in which, like reference numerals identify like elements, and in which:

FIG. 3 is a fragmentary exploded view in front perspective showing the relationship of the three basic panel types and connecting members at a three panel corner juncture of an isolation room;

FIG. 4 is a fragmentary partially sectioned view taken along the lines 4—4 of FIG. 1;

FIG. 5 is a perspective view in front elevation illustrating an isolation room formed from the panels of this invention and embodying the preferred form of the invention, the three different basic panels being labeled A', B' and C';

FIG. 6 is a fragmentary exploded perspective view in front elevation illustrating the assembled relationship of the three basic prefabricated panels, A', B' and C' utilized to form an isolation room;

FIG. 7 is a fragmentary partially sectioned view taken along the lines 7—7 of FIG. 5;

FIG. 8 is a fragmentary front perspective view illustrating the securement of two adjacent panels;

FIG. 9 is a fragmentary partially cutaway front perspective view showing the relationship of the three basic panels and connecting members at a three panel corner juncture of an isolation room; and FIG. 10 is a fragmentary perspective view in front elevation illustrating a reinforcing member secured on the planar surface of one of the panels.

Since the purpose of the invention is to provide a prefabricated, multi-panel isolation room formed from single shielded panels of three basic types, the particular features of this invention, for which patent is claimed, resides in the novel panel construction and the fastening of the marginal edges of the panels which, when connected, automatically attains continuity of electrical conduction between the several panels forming an electrically isolated room.

Figure 1:
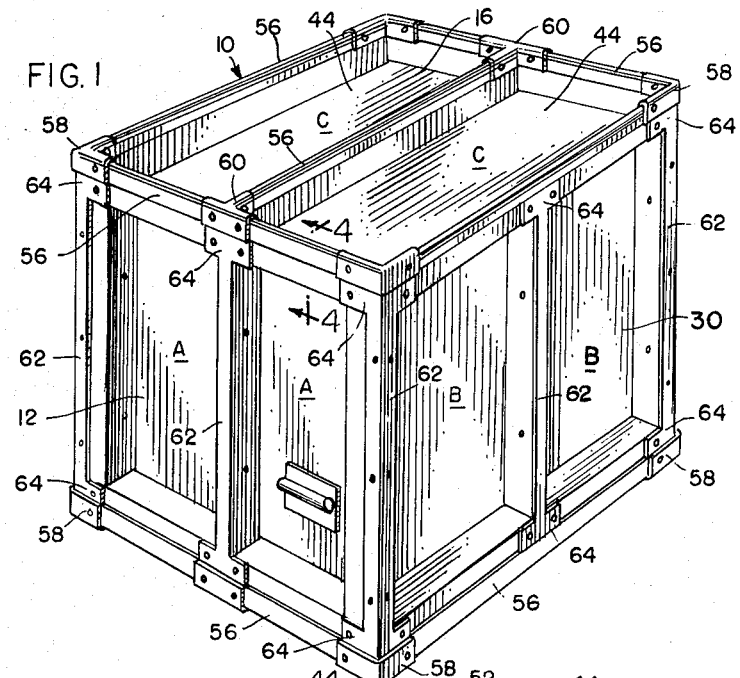
FIG. 1 is a perspective view in front elevation illustrating an isolation room formed from panels embodying the invention, the three different basic panels being labeled A, B and C.
Figure 2:
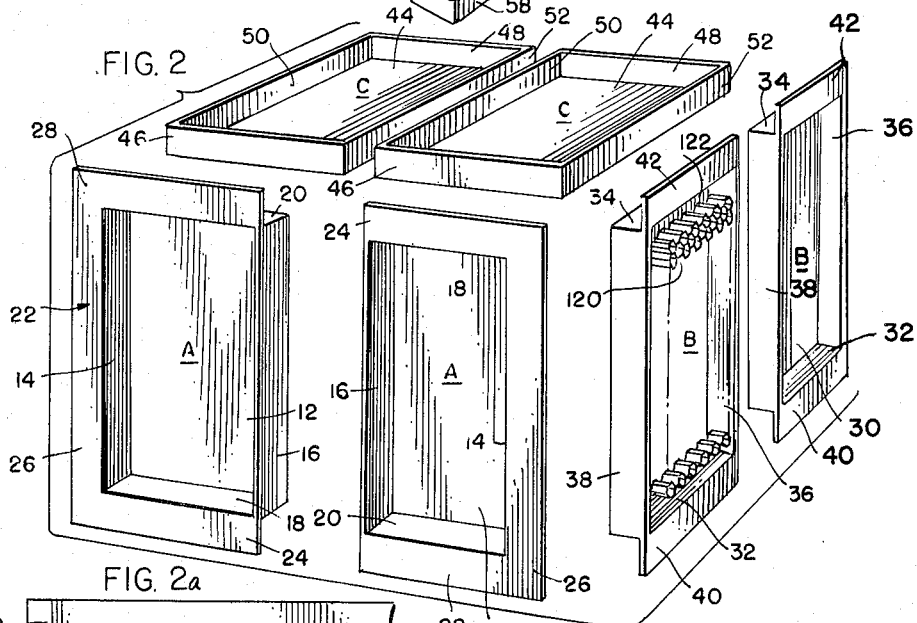
FIG. 2 is a fragmentary exploded perspective view in front elevation of the three basic or standard prefabricated panels, A, B and C utilized to form an isolation room.
Figure 2A:
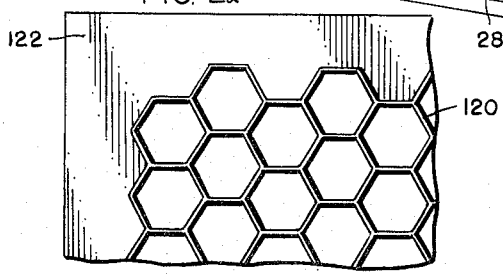
FIG. 2a is a fragmentary sectional side elevational view of the honeycomb structure utilized in the panel construction.

Referring now to the drawings, in which like numerals refer to like parts, and specifically to FIGS. 1 and 2, an isolation room 10 is constructed from three basic or standard prefabricated panel types A, B and C. As best seen in FIG. 2, the panels A, B and C are substantially identical in configuration, varying only in the positioning and relationship of extending lip portions.

The panels A, B and C are preferably formed from a solid metallic sheet material, such as 24 ounce copper. Each panel is preferably rectangular in shape and provides a configuration of a large shallow pan.

Still referring to FIG. 2, the panel A includes a bottom wall 12, opposing side walls 14 and 16, and opposing end walls 18 and 20. The end and side walls are secured in contiguous relationship and extend upwardly at right angles from the bottom wall to provide the shallow pan configuration. An extending lip, indicated generally by the numeral 22, is integrally formed and may extend inwardly or outwardly from a plurality of sides of the panel. In the embodiment shown in FIG. 2, the lips extend outwardly from three sides of the panel and parallel to the bottom wall. The lip 22 includes a portion 24 integral with the end wall 18, a portion 26 integral with side wall 14 and a portion 28 integral with the end wall 20.

The panel B has a similar shallow pan configuration as panel A, having a bottom wall 30, opposing end walls 32 and 34, and opposing side walls 36 and 38. A lip portion 40 is integrally formed and extends outwardly from the end wall 32 and a similar lip portion 42 is integrally formed and extends outwardly from the other end wall 34.

Panel C is of like configuration and includes a bottom wall 44, opposing end walls 46 and 48 and opposing side walls 50 and 52. Panel C does not provide an extending lip portion.

The extending lip portions on the different panels, in conjunction with the end walls and side walls of the panels, abut in mating side by side relationship whereby connector members may be readily disposed over the marginal edges of the abutting lip portions and walls to secure the adjacent panels in rigid conductive contact.

Referring now more specifically to FIGS. 1 and 3, the panels A, B and C are formed to permit an overlapping mating engagement of one panel with another to increase rigidity and strength of the structure, to provide greater surface contact area for total sealing and conductivity between contiguous panels and, as previously mentioned, to present adjacent extending marginal edges for receipt of connector members to secure the adjacent panels together.

In FIG. 3, a three panel corner juncture of the isolation room is illustrated in perspective. The bottom wall 44 of panel C sets on the end wall 34 of panel B and the end wall 18 of panel A. Side wall 52 of panel C abuts the extending lip portion 42 of panel B and the end wall 46 of panel C abuts the extending lip portion 24 of panel A. In similar fashion, the bottom wall 30 of panel B seats on the side wall 14 with side wall 38 of panel B abutting the extending lip portion 26 of panel A.

Referring now to FIGS. 2, 3 and 4, an angularly contoured contact member 54, preferably formed from a thin strip of spring bronze, is disposed between abutting lip and wall portions as shown between the bottom wall 30 of panel C and the end walls 18 and 20 of panel A and end walls 32 and 34 of panel B. As readily seen in FIG. 4, the contact member 54 also extends up between the side and end walls of the C panels and the mating lip portions of the A and B panels. The contact member 54 insures total sealing of the juncture between panels A and B with the panel C.

Referring now to FIGS. 1, 3 and 4, the abutting edges and lip portions of the panels are securely held by connector members 56 received over the marginal edges thereof and drawn tightly against the abutting surfaces by a nut and bolt combination passing through the combined thickness of the side wall, lip and connector member.

Turning first to the juncture between the side panels A and B with the top and bottom panels C, as best seen in FIGS. 3 and 4, a connector member 56, preferably formed from a metallic strip, provides an inverted U configuration with the space between the leg portions sufficient to be received over the combined thickness of the abutting wall and lip portion of the adjacent panels. As seen in FIG. 1, the entire upper and lower periphery of the isolation room is provided with the connector members 56. In like manner, the intermediate connection between two adjacent C panels is accomplished by a connector member 56.

The leg portions of the connector member 56, when secured over the extending marginal edges of the abutting surfaces of the panels extends over one half of the total surface of the lip portions. At spaced intervals, securing members, such as a nut and bolt combination, pass through the legs of the connector member and are drawn together to clamp the abutting surfaces into solid, physical, conductive contact.

As readily seen in FIG. 3, the extreme ends of the connector members 56 abut one another at the three panel corner junctures. To insure total sealing of the room, a right angle connector member 58 is received over the abutting connector members 56 to cover the seam formed therebetween. In similar manner, as best seen in FIG. 1, a T shaped connector member 60 is received over the seam formed at the intersection of the connector members 56 securing the adjacent C panels and the connector members 56 securing the C panels with the side panels A and B.

The two panel corner junctures and the walls of the adjacent side panels A and B are secured by a connector member 62 having a U-shaped configuration, similar to the connector member 56, to be received over the marginal edges of the abutting surfaces of the adjacent panels. The connector members 62 are provided on each extremity with a flat arm portion 64 which extends outwardly transverse to the leg portions of the U-shaped portions. The arm portion 64 is designed to lie flat against the lip portion of the panels adjacent the lower edges of connector members 56 as seen in FIGS. 1 and 3.

In securing a two panel corner juncture, the arm portion 64 is bent to form a right angle to permit one half of the arm to lie flat against the lip portion of panel A and the other half of the arm to lie flat against the lip portion of panel B as seen in FIG. 1. The connector members 62 are secured by passing securing members such as a bolt and nut combination through the arm 64 and the abutting surfaces of the panels.

It is now readily understood that every seam formed by abutting walls and lip portions of the adjacent panels are covered by a connector member and seams formed by the connector members are in turn covered by additional connector members making the entire enclosure sealed from wave emanations.

It is also readily understood that the connector members, in addition to clamping and securing the abutting surfaces of the panels into conductive contact, serve as a reinforcement of the structure by providing additional strength at the seams and the corner junctures.

Referring now to FIGS. 5 and 6, the isolation room 10' is constructed from three basic or standard prefabricated panel types A', B' and C'. As best seen in FIG. 6, the panels A', B' and C' are substantially identical in configuration, varying only in their positioning and relationship of integrally formed lip portions which in this embodiment extend inwardly and parallel to the bottom wall 12 from the side or end walls.

An inwardly extending lip is contiguously formed on three of the walls of panel A. A lip portion 24' extends inwardly from end wall 18, a lip portion 26' extends inwardly from end wall 20. Panel B' has an inwardly extending lip 35 on the side wall 36 and panel C' does not have any extending lip portions.

Preferably, the lip portions of all the panels are securely bonded, such as by brazing, to the adjacent side and end walls in a manner whereby the upper surfaces of the lip portions are at the same elevation as the upper marginal edges of the side and end walls.

The inwardly extending lip portions on the different panels, in conjunction with the end walls and side walls of the panels, abut in mating side by side overlapping relationship when assembled and receive connector members over their marginal edges to secure the adjacent panels in rigid conductive contact. The panels A', B' and C' are preformed to permit an overlapping mating engagement of one panel with another to increase rigidity and strength of the structure, to provide greater surface contact area for total sealing and conductivity between contiguous panels and, as previously mentioned, to present adjacent marginal edges of the lip portions and walls for receipt of connector members to secure the adjacent panels together.

As best seen in FIGS. 7 and 8, the adjacent abutting panels are illustrated in their secured position. A connector member 56', preferably formed from a metallic strip, provides a U configuration with a space between the leg portions sufficient to receive the combined thickness of the abutting walls and lip portions of the adjacent panels and any contact member 54 (not shown in FIGS. 7, 8 and 9) that may be used to close the joint. The leg portions of the connector member 56', when in position, extend over substantially the entire surface area of the abutting surfaces. Although the dimensional distance between the legs of the connector member 56', relative to the combined thickness of the abutting lip portions and walls of the panels, permits frictional securement of the connector member in position, the connector member is further secured in position by a plurality of spaced apart fastener members 58', illustrated in the drawings as a conventional nut, bolt and washer combination. When the fastener members 58' are drawn tight, the connector member 56' securely clamp the total abutting surfaces of the extending lip portions and walls in a tight sealing surface to surface relationship. All of the seams formed by the multiple contiguous panels are completely covered by the connector members and the abutting surfaces are securely held in surface to surface contact to provide a solid leakproof enclosure.

Referring now specifically to FIG. 9, one of the eight, three panel corner junctures of the isolation room is illustrated in perspective. The bottom wall 12 of the A' panel is positioned on the floor or foundation (not shown) with the end and side walls extending upwardly. A B' panel is positioned adjacent the end wall 20 of the A' panel whereby the end wall 34 of the B' panel seats on the upper surface of the inwardly extending lip portion 28' of the A' panel. In this position the outer surface of the bottom wall 12 of the B' panel will be flush with the end wall 20 of the A' panel and will be disposed at right angles to the bottom wall 12 of the A' panel. A C' panel is then positioned adjacent the side wall 16 of the A' panel and the side wall 36 of the B' panel whereby the end wall 46 of the C' panel will seat on the upper surface of the inwardly extending lip portion 26' of the A' panel and the side wall 50 of the C' panel will abut the outer surface of the inwardly extending lip portion 35 of the B' panel. In this position, the outer surface of the bottom wall 44 of the C' panel will be flush with side wall 16 of the A' panel and the side wall 36 of the B' panel and is disposed at right angles to the bottom wall 30 of the B' panel and the bottom wall 12 of the A' panel.

As previously described, a connector member 56' is positioned over the marginal edges of the abutting lip portions and walls and receives the fastener members 58' at spaced intervals to securely clamp the abutting surfaces of the adjacent panels in a solid leakproof, conductive relationship.

Referring now to FIGS. 7 and 9, the extreme corner portions of the panels, although in surface to surface contact once the connector members 56' are fastened in position, are further secured to one another by a fastener member 60', illustrated as a bolt and nut combination in conjunction with a pair of opposing large washer members 61'. Once the fastener members 60' are drawn tight and the connector members 56' are in position, the total surface area of all abutting surfaces of the panel forming the room are in a solid leakproof relationship, electrically isolating the interior of the room. When the entire room is assembled and secured as just described, the outer surface of the room, as best seen in FIG. 5, is completely smooth with only the hairline seams formed by the adjacent panels being visible.

Referring now to FIG. 10, when the span of an individual panel becomes too large, the planar surface of the panel may require reinforcement. Several well known conventional panel reinforcement concepts may be employed but it has been found that a thin strip of metal 16, having a triangular configuration, as shown, and bonded to the outer surface of the panel provides excellent economical reinforcement for the panels.

What is claimed is:
1. An electrical isolation room comprising:
a plurality of preformed panels, each of said panels having a central rectangular portion and metal shielding presenting marginal flanges about the peripheral edges thereof extending outwardly away from the central portion,
said panels being positioned with adjacent central portions adjacent one another and with their marginal flanges coterminous at their outer edges and their interfaces in engagement with one another in pairs, and
interengagement means between the flanges including spring elements between said interfaces following the contour thereof, and
metal connector members extending around and bridging the coterminous edges in electrically shielded relationship to engage the remote faces of the flanges, and
means interengaging said members for securing the panels in supported electrical conductive contact with each other.
2. An electrical isolation room comprising:
a plurality of preformed panels of metal shielding, each of said panels having a central rectangular portion having marginal flanges about the peripheral edges thereof extending at right angles to the central portion,
said panels being positioned with the central portion of one panel adjacent the central portion of an adjacent panel,
said marginal flanges of adjacent panels having lip portions parallel with the central portions of their respective adjacent panels disposed in face-to-face contact with marginal flanges on the central portions of each abutting panel,
said flanges and lip portions contacting one another being coterminous at their outer edges with one another in pairs,
interengagement means between the flanges including electrically conductive elements between said pairs of contacting flanges and lip portions over a portion of their interface area,
metal connector members extending around and bridging the coterminous edges in electrically shielded relationship to engage the remote faces of the flanges, and
means interengaging said members for securing the panels in supported electrical conductive contact with each other.

3. An electrical isolation room constructed from a plurality of three basic preformed sheet metal panel configurations,
  each of said panels having rectangular central portions of sheet metal integrally bordered at each edge with an upstanding flange disposed at a right angle to the central portion,
  one of said panels having coplanar flanges extending beyond two opposite upstanding flanges and terminating in marginal edges
  another of said panels having coplanar flange extending beyond three of its upstanding flanges and terminating in marginal edges
  said last two mentioned panels being positioned adjacent to the remaining panels with adjacent edge portions of their central portions adjacent the central portions of said remaining panels and their coplanar flanges in face-to-face engagement with said upstanding flanges, respectively, at the corners of said room, and
  connector members disposed around the marginal edges of the face-to-face engaging flanges to secure the panels in electrically conductive shielding contact.

4. An electrical isolation room constructed from a plurality of three basic preformed sheet metal panel configurations,
  each of said panels having rectangular central portions of sheet metal integrally bordered at each edge with an upstanding flange disposed at a right angle to the central portion,
  one of said panels having coplanar flanges extending from two opposite upstanding flanges and terminating in marginal edges
  another of said panels having coplanar flanges extending from two contiguous upstanding flanges and terminating in marginal edges
  said last two mentioned panels being positioned adjacent to the remaining panels with adjacent edge portions of their central portions abutting edge portions of upstanding flanges of said remaining panels and their coplanar flanges in face-to-face engagement with said upstanding flanges, respectively, at the corners of said room, and
  connector members disposed around the marginal edges of the face-to-face engaging flanges to secure the panels in electrically conductive shielding contact.

5. An electrical isolation room of sheet metal constructed from
  a plurality of three basic preformed panel configurations secured together in contiguous relationship comprising
  first panel configuration having a bottom wall, parallel side walls, parallel end walls and lip portions integrally formed at right angles to said end walls and one of the side walls;
  a second panel configuration having a bottom wall, parallel end walls, parallel side walls and a lip portion integrally formed at right angles on each of said end walls;
  a third panel configuration having a bottom wall, parallel side walls and parallel end walls,
  said panels being disposed in contiguous relationship to form the room, said lip portions of the first and second panels beind disposed in face-to-face relationship, with side and end walls of another panel at the corners of the room, and
  connector members extending the length of said lip portions enclosing the marginal edges of the face-to-face walls and lip portions to secure the panels in electrical conductive relationship.

6. An electrical room constructed from
  a plurality of sheet metal panels, having three basic preformed panel configurations of metallic shielding secured together in contiguous relationship comprising
  first panel configuration having a bottom wall, parallel side walls, parallel end walls and lip portions integrally formed at right angles to said end walls and one of the side walls;
  a second panel configuration having a bottom wall, parallel end walls, parallel side walls and a lip portion integrally formed at right angles on each of said end walls;
  a third panel configuration having a bottom wall, parallel side walls and parallel end walls,
  said panels being disposed marginally in contiguous relationship with extended marginal edges of adjacent lip portions,
  side walls and end walls in side-by-side relationship,
  a U-shaped connector member disposed over the adjacent extending marginal edges and
  a bolt and nut clamp arrangement at spaced intervals through said connector member to secure the panels in solid electrical conductive relationship,
  said lip portions on one panel being disposed in face-to-face relationship with a parallel wall on two other panels and with a marginal portion of the bottom wall of said two other panels engaging the parallel walls having the lip portions thereon to provide two areas of contact at each lip disposed at a right angle to each other.

7. The combination called for in claim 6 including a spring element intermediate the walls and portions disposed in face-to-face relationship following in part the right angle character of said two areas.

8. An electrical isolation room constructed from a plurality of three basic preformed sheet metal panel configurations secured together in contiguous relationship comprising:
  first panel configuration having a bottom wall having parallel side walls, parallel end walls and lip portions integrally formed at right angles to said end walls and one of the side walls,
  a second panel configuration having a bottom wall, having parallel end walls, parallel side walls and a lip portion integrally formed at right angles to said end walls, the bottom wall of one of said second panel configurations having spaced apertures therethrough,
  a third panel configuration having a bottom wall having spaced apertures therethrough, parallel side walls and parallel end walls
  said panels being disposed in marginally contiguous relationship with extended marginal edges of adjacent lip portions, side walls and end walls in side-by-side relationship to define plural areas of contact therebetween disposed at right angles to one another at said side-by-side relationship and U-shaped connector members disposed over and enclosing the extending adjacent marginal edges to secure the panels in wholly sealed electrical conductive relationship.

9. An electrical isolation room comprising:
  a plurality of three basic types of preformed sheet metal panel configurations each having contiguous side and and end walls extending upwardly therefrom normal to and at the edges of a central flat portion thereof,
  two of said panels presenting coplanar lip portions extending towards one another from the walls to define a space between them and the central portion,
  said panels being positioned adjacent to one another in edge contiguous relationship with the lip portions and walls in overlapping face-to-face abutting relationship, and
  U-shaped connector members disposed over abutting extending lip portions and walls of adjacent panels and extending the length thereof, and
  clamping means accessible in part through said space and extending through the sides of the connector members and abutting lip portions and walls for clamping same tightly together to secure the panels into electrical conductive contact.

10. An electrical isolation room comprising:
a plurality of three basic types of preformed panels configurations secured together in contiguous relationship including,
a first panel configuration having a bottom wall, parallel side walls, parallel end walls and an inwardly extending lip portion formed on one of said side walls overhanging the bottom wall in parallel spaced relationship therewith;
a second panel configuration having a bottom wall, parallel end walls and parallel side walls;
a third panel configuration having a bottom wall, parallel side walls, parallel end walls, and coplanar lip portions formed on said end walls and one of the side walls and extending towards one another,
said panels being disposed in marginally contiguous relationship with extended marginal edges of adjacent lip portions, side walls and end walls in face-to-face contacting relationship,
U-shaped connector members extending the length of and disposed over the extending adjacent marginal edges, means engaging opposite sides of the U-shaped connector member clamping same against said contacting lip portions and walls in pressure contacting relationship to secure the panels in electrical conductive relationship.

11. An electrical isolation room constructed from a plurality of three basic preformed panel configurations formed from a single sheet of metallic shielding secured together in continuous relationship comprising:
a first panel configuration including a bottom wall having contiguous parallel end walls and parallel side walls about the periphery thereof and a lip portion formed at right angles spaced above said bottom wall on the upper edge of one of said side walls;
a second panel configuration including a bottom wall having contiguous parallel side walls and parallel end walls about the periphery thereof;
a third panel configuration including a bottom wall having contiguous parallel side walls and parallel end walls about the periphery thereof and coplanar lip portions formed to extend towards one another at right angles on the upper edge of said end walls and one of the side walls;
said panels disposed adjacent to one another with the lip portions, said walls and end walls in abutting face-to-face relationship,
a U-shaped connector member extending the length of and disposed over and enclosing the marginal edges of the abutting lip portions to obstruct exit of interference waves entering between said face-to-face relationship, side and end walls, and
a bolt and nut arrangement at spaced intervals through said connector member and abutting lap portions, side and end walls to secure in clamped relationship the panels in solid electrical conductive relationship.

12. An electrical isolation room constructed from a plurality of three basic preformed panel configurations formed from a single sheet of solid metallic sheet shielding secured together in contiguous relationship comprising:
a first panel configuration including a bottom wall having contiguous parallel end walls and parallel side walls about the periphery thereof and a lip portion integrally formed inwardly at right angles on the upper edge of one of said side walls above and spaced from said bottom wall;
a second panel configuration including a bottom wall having contiguous parallel side walls and parallel end walls,
a third panel configuration including a bottom wall having contiguous parallel side walls and parallel end walls,
a third panel configuration including a bottom wall having contiguous parallel side walls and parallel end walls about the periphery thereof and lip portions integrally formed inwardly at right angles on the upper edge of said end walls and one of the side walls;
said panels disposed adjacent to one another with the lip portions,
said walls and end walls being in abutting side by side relationship,
an elongated metallic U-shaped connector member disposed over the extending marginal edges and substantially covering the total surface of the abutting lip portions, side and end walls, and
a bolt and nut arrangement disposed at spaced intervals through said connector member and said abutting lip portions, side and end walls in a direction paral- to the adjacent bottom wall to rigidly secure the panels in solid electrical conductive relationship.

No references cited.

JOHN F. BURNS, *Primary Examiner.*

DARRELL L. CLAY, *Examiner.*